United States Patent [19]
Chung

[11] Patent Number: 5,590,730
[45] Date of Patent: Jan. 7, 1997

[54] STRAIGHT TRAVELLING APPARATUS FOR CONSTRUCTION VEHICLES

[75] Inventor: Hae-Gyoon Chung, Pusan, Rep. of Korea

[73] Assignee: Samsung Heavy Industry Co., Ltd., Kyung Nam, Rep. of Korea

[21] Appl. No.: 334,542

[22] Filed: Nov. 4, 1994

[51] Int. Cl.$^6$ ............................. B62D 11/02; F16D 31/02
[52] U.S. Cl. ................................................ 180/6.3; 60/421
[58] Field of Search ............................... 180/6.3; 60/421, 60/429

[56] References Cited

U.S. PATENT DOCUMENTS

| | | | |
|---|---|---|---|
| 4,078,681 | 3/1978 | Field, Jr. .................... | 60/421 X |
| 4,570,441 | 2/1986 | Yoshida et al. ................ | 60/421 |
| 4,838,756 | 6/1989 | Johnson et al. ................ | 60/429 X |
| 5,083,428 | 1/1992 | Kubomoto et al. ............. | 60/421 |

FOREIGN PATENT DOCUMENTS

| | | | |
|---|---|---|---|
| 0378742 | 7/1990 | European Pat. Off. ......... | 180/6.3 |
| 62-55271 | 3/1987 | Japan .......................... | 180/6.3 |

*Primary Examiner*—Anne Marie Boehler
*Assistant Examiner*—Victor E. Johnson
*Attorney, Agent, or Firm*—Lieberman & Nowak, LLP

[57] ABSTRACT

Straight travelling apparatus for construction vehicles capable of keeping the construction vehicle travelling straight even when a work implement of the construction vehicle is manipulated during travelling. The apparatus includes hydraulic circuitry for making the hydraulic oil of first and second pumps be supplied to left and right travelling motors respectively when only the left and right travelling motors are operated, and making the oils be confluent together and equally distributed and supplied to the left and right travelling motors when even one work implement is to be manipulated at the same time as operating the left and right travelling motors. The hydraulic circuitry includes left and right directional selecting valves and a confluent line extending between the directional selecting valves for selectively making the hydraulic oil confluent together.

3 Claims, 3 Drawing Sheets

STRAIGHT TRAVELLING APPARATUS FOR CONSTRUCTION VEHICLES

BACKGROUND OF THE INVENTION

1. Field of the Invention

The present invention relates in general to a straight travelling apparatus for construction vehicles such as excavators, cranes and, more particularly, to an apparatus for keeping the travelling direction of construction vehicles straight even when a work implement of the vehicle is being manipulated during travelling.

2. Description of the Prior Art

In typical construction equipment such as excavators, cranes and other construction equipment capable of travel, travelling actuators, i.e., travelling motors, and working actuators i.e., boom cylinders and arm cylinders for actuating booms and arms are operated by pressurized oil delivered from first and second hydraulic pumps of the same displacement capacity.

With reference to FIG. 1, there is shown a typical hydraulic circuit of a hydraulic excavator. As shown in this drawing, first and second hydraulic pumps P1 and P2 having the same capacity are driven by an engine E. The first pump P1 delivers the pressurized oil for operating a swing motor SW, a left travelling motor TL and an arm cylinder ARM, while the second pump P2 delivers the pressurized oil for operating a boom cylinder BM, a right travelling motor TR, an optional actuator OPT and a bucket cylinder BKT. In the drawing, the reference characters V1, V2 and V3 denote directional control valves for the swing motor SW, the left travelling motor TL and the arm cylinder ARM respectively, while the reference characters V4, V5, V6 and V7 denote direction control valves for the boom cylinder BM, the right travelling motor TR, the optional actuator OPT and the bucket cylinder BKT respectively.

The hydraulic circuit of FIG. 1 also includes a pair of center bypass lines 101 and 102 for directly returning the pressurized oil of the first and second pumps P1 and P2 to an oil tank T when all the directional control valves V1 to V7 are in their neutral positions.

The hydraulic circuit further includes a pair of parallel lines 103 and 104 for supplying exclusively or in parallel the pressurized oil of the pumps P1 and P2 to at least one actuator when at least one of the directional control valves V1 to V7 is being operated. The reference character Pi denotes a pilot pump for providing spool operating pressures for the valves V1 to V7, while the reference numerals 105a and 105b denote control vanes for the left and right travelling motors TL and TR respectively.

When the valves 105a and 105b for the left and right travelling motors TL and TR of the above hydraulic circuit are operated after starting the engine E, the pressurized oil of the first pump P1 is supplied to the left travelling motor TL through the first parallel line 103 and the second valve V2, while the pressurized oil of the second pump P2 is supplied to the right travelling motor TR through the second parallel line 104 and the fifth valve V5. At this time, the hydraulic excavator travels straightly on the work field since the capacities of the two pumps P1 and P2 are equal to each other.

When at least one work implement, the arm for example, is manipulated by supplying the pressurized oil of the first pump P1 to the arm cylinder ARM during the straight travelling of the vehicle, the pressurized oil of the pump P1 is simultaneously supplied to both the left travelling motor TL and the arm cylinder ARM through the first parallel line 103. Thus, the amount of pressurized oil supplied to the left travelling motor TL will be reduced and this causes a difference in the amount of pressurized oil supplied to the left and right travelling motors TL and TR. Therefore, the construction equipment will not keep travelling straight but will turn left undesirably. Furthermore, when the desired oil pressure of the work implement, which should be manipulated at the same time as driving the vehicle, is higher than the oil pressure of the travelling motor, such as when the arm-out motion will be carried out, the work implement may not be manipulated at all.

Accordingly, the hydraulic circuit should be equipped with a straight travelling apparatus for keeping the travelling direction of the construction vehicle straight even when a work implement is being manipulated at the same time as travelling. Typical straight travelling apparatus are designed so that the first and second pumps P1 and P2 deliver their pressurized oils for the left and right travelling motors T1 and TR respectively when no work implement is being manipulated while the construction vehicle is travelling. However, when even one work implement is being manipulated while the construction vehicle is travelling, the apparatus makes the pressurized oil of either the first or second pumps P1 and P2 be equally supplied to the travelling motors TL and TR and makes the pressurized oil of the other pump P1 or P2 be supplied to an actuator for the work implement to be manipulated.

However, the above straight travelling apparatus has a problem. That is, the travelling velocity of the construction vehicle will be abruptly reduced since the pressurized oil of either the first or second pumps P1 and P2 is supplied to the travelling motors TL and TR when even one work implement is being manipulated while the construction vehicle is travelling.

Another problem of the typical apparatus is resided in that the above oil supply operation will be carried out even when the work implement to be manipulated during travel of the construction vehicle requires a minimum oil pressure. This deteriorates off distribution efficiency of the hydraulic circuit of the equipment.

SUMMARY OF THE INVENTION

It is, therefore, an object of the present invention to provide straight travelling apparatus for construction vehicles in which the above problems can be overcome and which keeps the travelling direction of the construction vehicle straight even when a work implement of the equipment is manipulated during travelling.

It is another object of the present invention to provide straight travelling apparatus for construction vehicles which lets a work implement, which implement requires an oil pressure higher than the oil pressure of the travelling motor, be definitely operated even when the work implement is being manipulated while the vehicle is travelling, and which apparatus prevents the abrupt reduction of travel velocity even when actuating the work implement during travelling of the vehicle and achieves efficient oil distribution of the hydraulic circuit.

In order to accomplish the above object, the present invention provides straight travelling apparatus for construction vehicles, the construction vehicles having first and second hydraulic pumps of the same capacity and left and right travelling motors and the other actuators for work implements, which motors and actuators are operated by pressurized oil delivered from the first and second pumps, comprising: means for making the oils of the first and second pumps be supplied to the left and right travelling motors respectively when only the left and right travelling motors are operated, but making the oils of the first and second pumps be confluent together and equally distributed and supplied to the left and right travelling motors when even one work implement is being manipulated at the same time as operating the left and right travelling motors.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
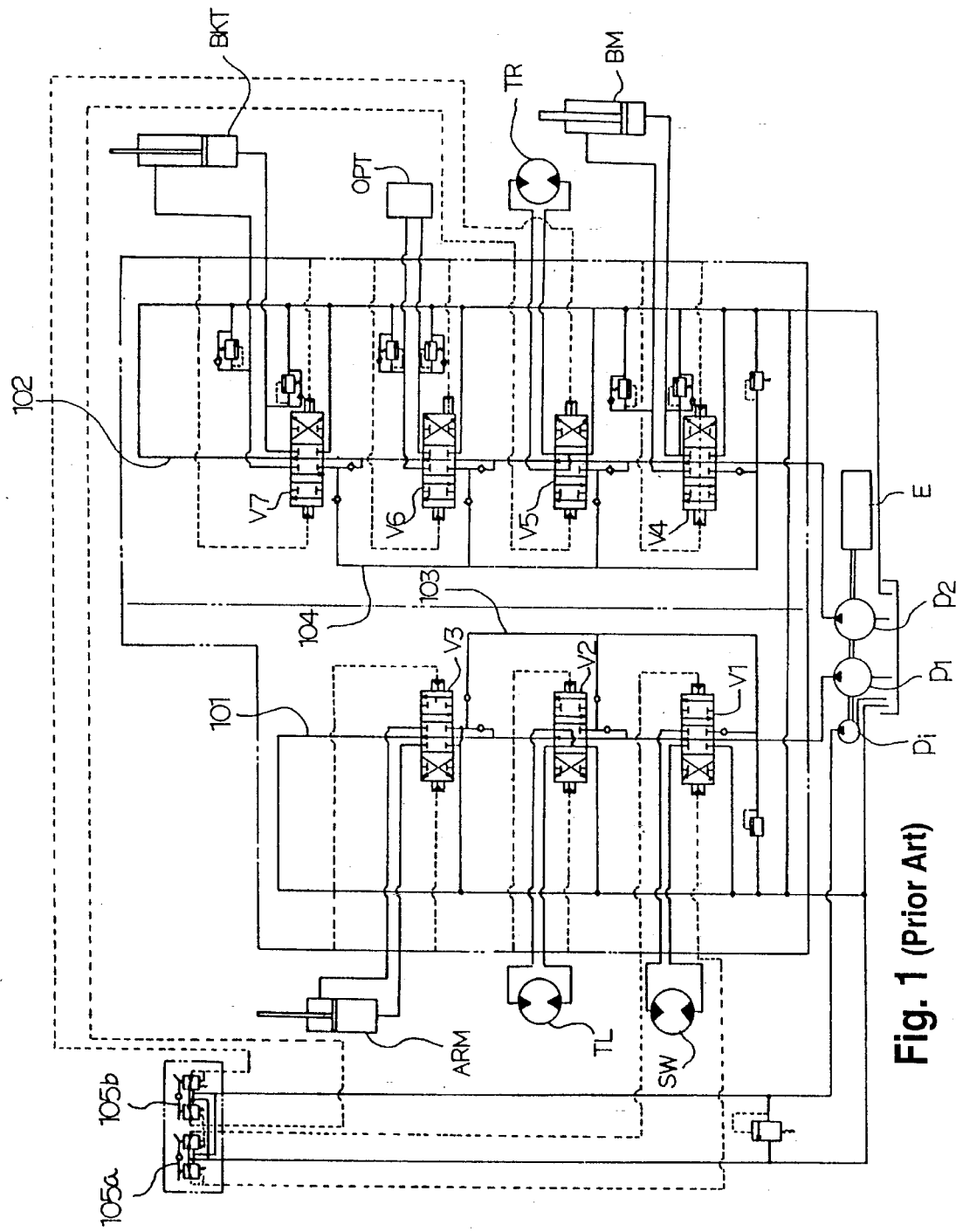
FIG. 1 is a typical hydraulic circuit diagram of a hydraulic excavator.
Figure 2:
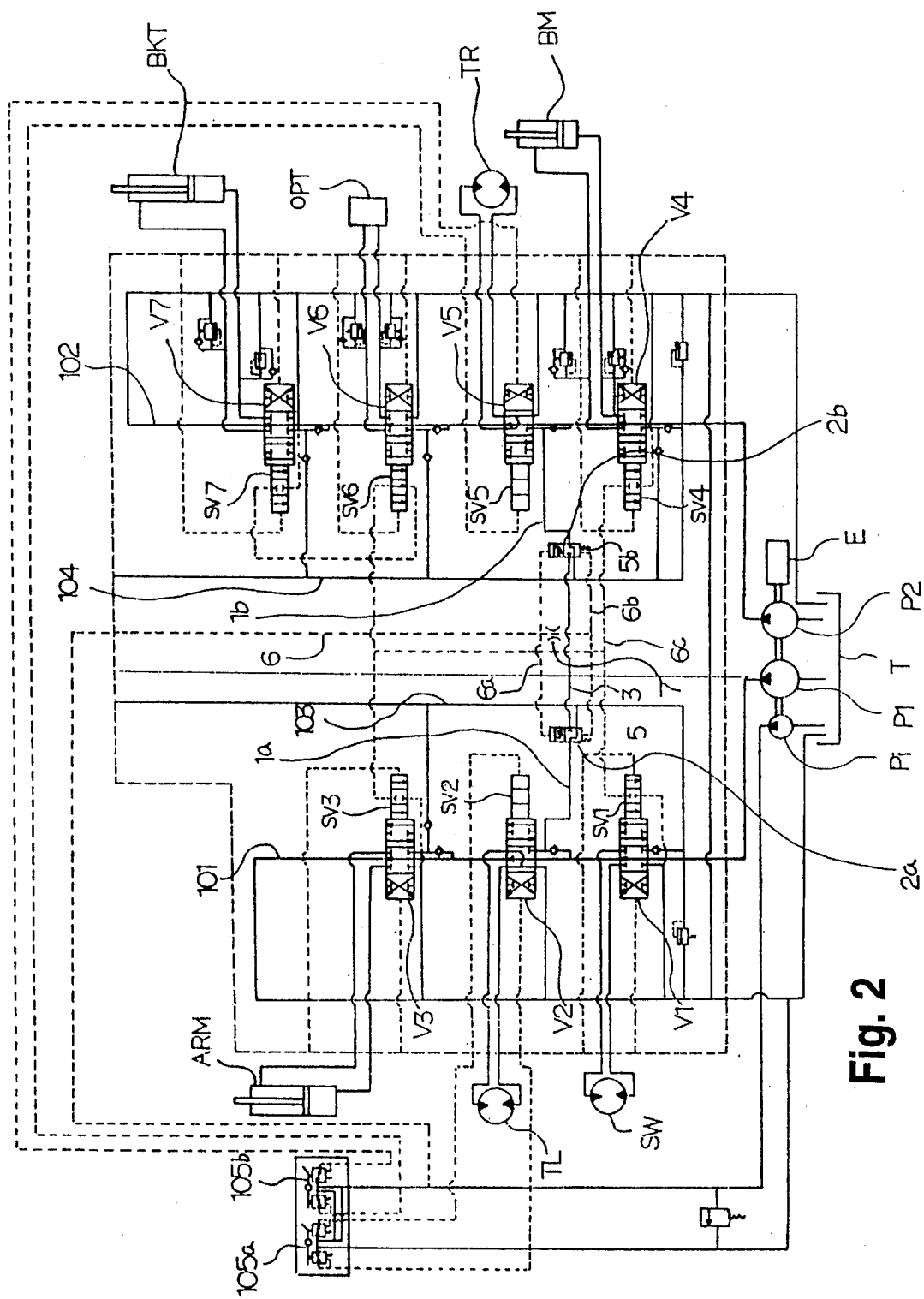
FIG. 2 is a main hydraulic circuit diagram of a hydraulic excavator provided with straight travelling apparatus of the present invention.

With reference to FIG. 2, there is shown a hydraulic circuit of a hydraulic excavator provided with straight travelling apparatus of a preferred embodiment of the present invention. In the hydraulic circuit of the present invention, most of the elements are common with those of the prior embodiment of FIG. 1. Those elements common to both the present invention and the prior embodiment will carry the same reference numerals or reference characters and the general operation of the hydraulic circuit will not be given in the following description.

The straight travelling apparatus of the present invention includes means for making the oils of first and second pumps be supplied to left and right travelling motors respectively when only the left and right travelling motors are operated, but making the oils be confluent together and equally distributed and supplied to the left and right travelling motors when even one work implement is being manipulated at the same time as operating the left and right travelling motors. The means will be described in detail hereinbelow.

As shown in FIG. 2, a left directional selecting valve 2a is placed on a left parallel line 1a, which line 1a is provided for a left travelling motor TL. In the same manner, a right directional selecting valve 2b is placed on a right parallel line 1b, which line 1b is provided for a right travelling motor TR. The left and right directional selecting valves 2a and 2b which have the same construction are selectively connected to each other through a confluent line 3.

Figure 3:
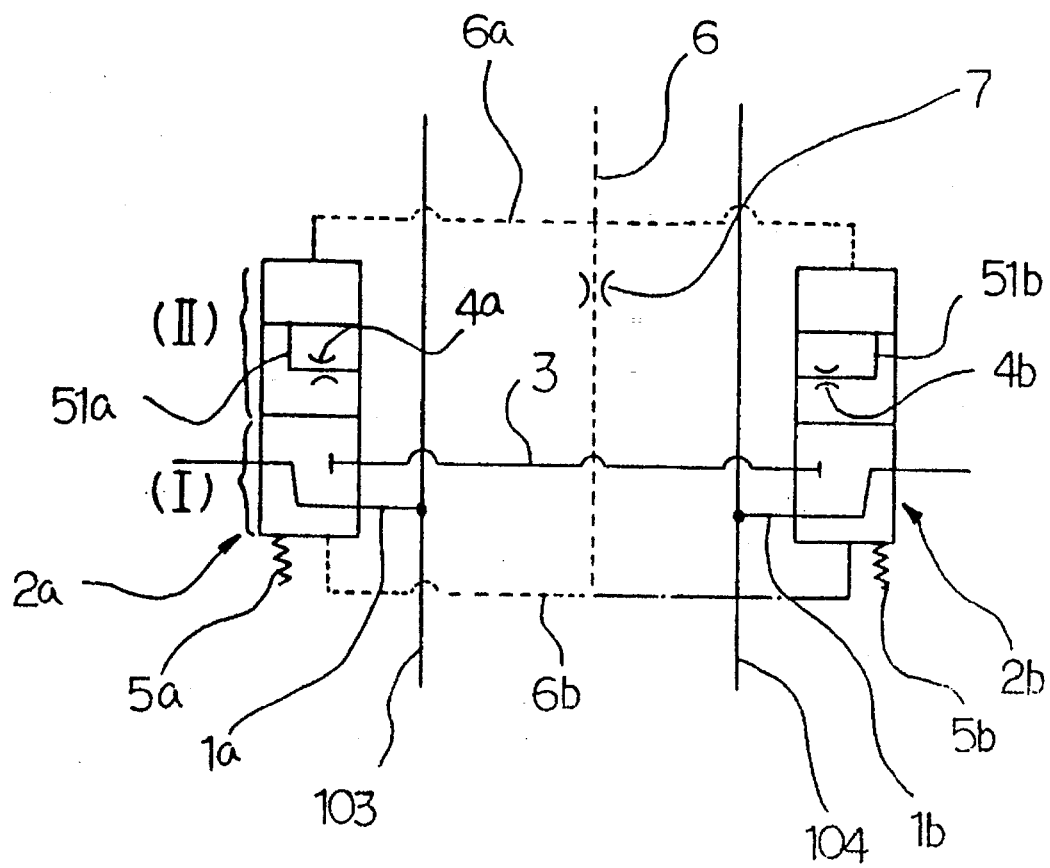
FIG. 3 is a detailed hydraulic circuit diagram of directional selecting valves of the main hydraulic circuit of FIG. 2.

Turning to FIG. 3 showing a detailed hydraulic circuit of the directional selecting valves 2a and 2b of the straight travelling apparatus of the present invention, the state of the valves 2a and 2b is changed between a first state and a second state in accordance with the internal passage selection accompanied by moving the spools of the valves 2a and 2b. In the first state, the confluent line 3 is shut, so that the left and right parallel lines 1a and 1b do not communicate with the confluent line 3. In this case, the pressurized oils of the parallel lines 1a and 1b are not confluent together. In the second state, the confluent line 3 is opened, so that the left and right parallel lines 1a and 1b communicate with the confluent line 3 through the line 3. In this case, the oils of the parallel lines 1a and 1b are confluent together. The valves 2a and 2b include their internal passages 51a and 51b, which passages 51a and 51b are adapted for connecting the pump-side parts of the parallel lines 1a and 1b to the travelling motor-side parts of the parallel lines 1a and 1b respectively in the second state. The internal passages 51a and 51b are provided with their orifices 4a and 4b. The directional selecting valves 2a and 2b are initially adjusted by their pressure setting springs 5a and 5b so that the valves 2a and 2b are initially set in the first state I. The pressure receiving parts and the pressure distributing parts of the valves 2a and 2b are supplied with pilot oil under pressure through a pilot line 6 (or a first pilot line) and a pressure receiving pilot line 6a and a pressure distributing pilot line 6b, which lines 6a and 6b branch from the first pilot line 6. The pressure receiving parts and the pressure distributing parts of the valves 2a and 2b thus change the state of the valves 2a and 2b between the first state I and the second state II. A second pilot line 6c, which branches from a point of the pressure distributing pilot line 6b, passes through selector valves SV1, SV3, SV4, SV6 and SV7 of the directional control valves V1, V3, V4, V6 and V7 and, thereafter, returns to the oil tank T through a return line. The selector valves SV1, SV3, SV4, SV6 and SV7 will shut the second pilot line 6c when the directional control valves V1, V3, V4, V6 and V7 are in their neutral positions, and open the pilot line 6c when the valves V1, V3, V4, V6 and V7 are operated in either direction. When the pilot line 6c is opened, the pressurized oil in the pressure distributing pilot line 6b will return to the tank T. An orifice 7 is placed on the first pilot line 6 between the branching points, from which points the pressure receiving pilot line 6a and pressure distributing pilot line 6c branch from the first pilot line 6 respectively.

The operational effect of the above straight travelling apparatus of the present invention will be given hereinbelow.

When all the travelling and working actuators TL, TR, SW, ARM, BM, OPT and BKT are in their neutral positions, the pressurized oils delivered from the first and second pumps P1 and P2 directly return to the tank T through the center bypass lines 101 and 102 respectively.

When the directional control valves V2 and V5 for the travelling motors TL and TR are operated so as to drive the motors TL and TR, the pressurized oil of the first pump P1 is supplied to the left travelling motor TL through the first parallel line 103 and the valve V2, while the pressurized oil of the second pump P2 is supplied to the right travelling motor TR through the second parallel line 104 and the valve V5. At this time, the directional selecting valves 2a and 2b, which valves are placed on the parallel lines 103 and 104 respectively, are kept in the first state I. Therefore, the first line 103 is directly connected to the directional control valve V2 through the internal passage of the left directional selecting valve 2a, while the second line 104 is directly connected to the directional control valve V5 through the internal passage of the right directional selecting valve 2b. In this case, the pressure receiving parts of the valves 2a and 2b are applied with the same pressure through the pressure receiving pilot line 6a. In the same manner, the pressure distributing parts of the valves 2a and 2b are applied with the same pressure through the pressure distributing pilot line 6b. However, the valves 2a and 2b in the above state are kept in the first state due to the biasing force of the pressure setting springs 5a and 5b.

When even one of the work Implements SW, ARM, BM, OPT and BKT are being manipulated during driving, the travelling motors TL and TR, at least one associated valves V1, V3, V4, V6, V7 are operated so that the selector valve SV1, SV3, SV4, SV6, SV6 of the associated valve V1, V3, V4, V6, V7 moves so that the second pilot line 6c is thus opened. Hence, the second pilot line 6c communicates with the pressure distributing pilot line 6b and this causes the pressurized oil, which oil was introduced into the pilot line 6b from the first pilot line 6 through the orifice 7, to directly return to the tank T through the second pilot line 6c. The pressure of the pressure distributing parts of the valves 2a and 2b or the pressure in the pilot line 6b becomes lower than the pressure of the pressure receiving parts or the pressure in the pilot line 6a. Due to the pressure difference between the pressure receiving parts and the pressure distributing parts, the state of the valves 2a and 2b is changed into the second state while overcoming the biasing force of the pressure setting springs 5a and 5b. In the above second state, the left and right parallel lines 1a and 1b communicate with the confluent line 3. The oils delivered from the first and second pumps P1 and P2 flow together in the confluent line 3 when the oils flow in the valves 2a and 2b of the parallel lines 103 and 104. Thus, the interior pressure of the line 103 becomes equal to the interior pressure of the line 104. The oils of the same pressure, after being confluent, are supplied to the left and right travelling motors TL and TR through the directional control valves V2 and V5 respectively.

At the same time of oil supply for the travelling motors TL and TR, a part of the pressurized oil is supplied through one of the parallel lines 103 and 104 to the actuator of the work implement to be manipulated during travelling of the construction vehicle. For example, when the arm cylinder ARM will be operated while driving the travelling motors TL and TR, the pressurized oil of the first pump P1 is partially supplied to the directional control valve V3 of the arm cylinder ARM through the first parallel line 103.

In the prior apparatus, the pressurized oil of the first pump P1 will be supplied to both the left travelling motor TL and the arm cylinder ARM, so that the oil amount to be supplied to the left travelling motor TL will be less than the oil amount to be supplied to the right travelling motor TR, which motor TR will be supplied with all the pump delivery of the second pump P2. In this case, the construction vehicle will not keep travelling straight but turn to either direction as described in the description of the prior art. However, the straight travelling apparatus of the present invention has directional selecting valves 2a and 2b and the confluent line 3 which make the oil of the first pump P1 and the oil of the second pump P2 selectively flow together. Hence, the oil of the pumps P1 and P2 except for the amount of oil to be supplied to the arm cylinder ARM will be equally distributed and supplied to the travelling motors TL and TR.

In addition, there will be pressure loss in the oil flowing in the directional selecting valves 2a and 2b when the oil passes through the orifices 4a and 4b respectively provided in the internal passages of the valves 2a and 2b. In this regard, the work implement, which is to be operated during travelling of the construction equipment, will be definitely operated even when the work implement requires an oil pressure higher than the oil pressure of the travelling motors TL and TR.

In accordance with the straight travelling apparatus of the present invention, the oils of the first and second pumps P1 and P2 except for the amount of oil to be supplied to a work implement will be confluent together and, thereafter, equally distributed and supplied to the travelling motors TL and TR when the work implement is to be manipulated during travelling. Therefore, the construction vehicle of the present invention does not turn to either direction but keeps travelling straight.

Moreover, as the oils of the first and second pumps P1 and P2 except for the amount of oil to be supplied to the work implement are equally supplied to the travelling motors TL and TR, possible abrupt reduction of the travel velocity, which reduction is caused by actuating the work implement during travelling, will be prevented. The function for preventing abrupt reduction of the travel velocity will give full effect to the oil distribution efficiency particularly when actuating a work implement requiring a minimum amount of oil, such as the bucket, during travelling. However in the prior embodiment, the oil distribution efficiency will be deteriorated in the case of actuating the bucket while travelling since the amount of oil of one pump will be totally supplied to the bucket, while the amount of oil of the other pump will be distributed to the travelling motors.

Due to the orifices provided in the directional selecting valves, the amount of oil to be supplied to the travelling motors will be limited in part. In this regard, even the motion of a work implement requiring a large amount of oil such as the arm-out motion will be definitely carried out in accordance with the present invention.

As described above, the straight travelling apparatus for construction vehicles of the present invention keeps vehicles such as excavators or cranes travelling straight even when one work implement is manipulated during travelling. Furthermore, the apparatus of the present invention does not cause abrupt reduction of the travel velocity differently from the prior apparatus when actuating the work implement while travelling, so that the apparatus improves the stability of travelling and working of the vehicle.

Although the preferred embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. In a straight traveling apparatus for a construction vehicle, said vehicle having first and second hydraulic pumps of equal capacity, left and right traveling motors and actuators for working members, said traveling motors and actuators for the working members being operated by pressurized oil supplied from the first and second hydraulic pumps, wherein the improvement comprises:

selectable interconnection means having a first state in which the first and second hydraulic pumps supply oil to the left and right traveling motors respectively when only the left and right motors are being operated, and a second state in which the oil supplied by the first and second hydraulic pumps is joined together and supplied equally to the left and right traveling motors when at least one working member is to be operated at the same time as the left and right traveling motors;

wherein said selectable interconnection means include a left parallel line extending between said first pump and said left traveling motor, said left parallel line having a left directional selecting valve, a right parallel line extending between said second pump and said right traveling motor, said right parallel line having a right directional selecting valve, and a confluent line extending between the left and right directional selecting valves, each of said left and right directional selecting valves having internal passages selected by a movable spool, each of said left and right directional selecting valves being changed between the first state and the second state in accordance with internal passage selection by movement of the spools, said confluent line being closed in the first state so that the left and right parallel lines are not connected to each other, said confluent line being opened in the second state to connect said left and right parallel lines.

2. The straight traveling apparatus according to claim 1, wherein said selectable interconnection means further comprises:

pressure setting means for elastically biasing the spools of said left and right directional selecting valves at a predetermined setting pressure so that the initial states of the directional selecting valves are set in the first state;

a main pilot line, a first pilot line branching from the main pilot line at a first branching point and a second pilot line branching from the main pilot line at a second branching point, said main pilot line transmitting the pilot oil pressure generated by a pilot pump, said first pilot line connected to the left and fight directional selecting valves so as to change the left and right directional selecting valves to the second state by applying the pilot pressure, and said second pilot line being connected to the left and right directional selecting valves so as to change the left and right directional selecting valves to the first state by applying the pilot pressure;

a pilot oil draining line branching from said second pilot line, said pilot oil draining line connected to a tank by way of selector valves for each of said actuators for working members, said selector valves opening the pilot oil draining line when the corresponding actuator for the working member is operated and closing the pilot oil draining line when the corresponding actuator for the working members is not operated to drain the pilot oil of said second pilot line when at least one of the actuators for the working members is operated; and an orifice provided in the main pilot line between the first branching point and the second branching point, keeping said left and fight directional selecting valves in said first state when the pilot oil of the second pilot line is not drained through the pilot oil draining line, and being changed into said second state due to the pressure difference between the first pilot line and the second pilot line, when the pilot oil of the second pilot line is drained through the pilot oil draining line.

3. The straight traveling apparatus according to claim 1, further comprising:

a first and a second orifice provided on internal passages of the left and right directional selecting valves respectively, each of said internal passages connecting a pump-side part of associated one of the left and right parallel lines to a traveling motor-side part of the associated parallel line in the second state.

* * * * *